June 15, 1965 J. M. SILLS 3,188,919
WINDSHIELD WIPER
Filed May 1, 1961 5 Sheets-Sheet 1

INVENTOR.
JOSEPH M. SILLS
BY
Mason, Kolehmainen, Rathburn and Wyss
ATTORNEYS

June 15, 1965  J. M. SILLS  3,188,919
WINDSHIELD WIPER
Filed May 1, 1961  5 Sheets-Sheet 3

INVENTOR.
JOSEPH M. SILLS
BY
Mason, Kolehmainen,
Rathburn and Wyss.
ATTORNEYS.

June 15, 1965

J. M. SILLS 3,188,919

WINDSHIELD WIPER

Filed May 1, 1961

INVENTOR.
JOSEPH M. SILLS
BY
Mason, Kolehmainen,
Rathburn and Wyss
ATTORNEYS.

United States Patent Office 3,188,919
Patented June 15, 1965

3,188,919
WINDSHIELD WIPER
Joseph M. Sills, 2759 Ridge Ave., Evanston, Ill.
Filed May 1, 1961, Ser. No. 106,641
5 Claims. (Cl. 91—264)

This invention relates to windshield wipers for vehicles, and particularly to windshield wiper motors of the fluid type for driving the wiper blade. The invention is also concerned with the means for connecting the motor to a wiper blade. The device of the present invention is particularly applicable to heavy duty operation, such as is encountered on buses and trucks.

Windshield wiper assemblies as conventionally provided on motor vehicles include a wiper blade oscillated across the vehicle windshield by a wiper motor through a wiper arm. Various motion transmitting linkages may interconnect the motor and the wiper arm to provide the desired oscillatory motion to the wiper blade. Windshield wipers used on buses and trucks generally comprise large wiper blades operated by a pneumatic motor which oscillates a shaft connected by suitable linkage or the like to the blade. Normally, such motors oscillate the wiper blade at approximately 70 cycles per minute. Such pneumatic motors generally reach their maximum speed as the wiper blade approaches the end of its stroke where it must be stopped and its direction of movement reversed. On the return stroke of the blade, the motor again reaches its maximum speed as the wiper blade reaches the end of its return stroke where it must again be stopped and its direction reversed. It is, of course, most difficult where a very heavy blade is involved to terminate its motion at the point of maximum speed. It would be desirable to provide a windshield wiper motor which has its maximum speed of movement at the center of the stroke of the driving blade and a decrease in speed as it approaches either end of its stroke.

Prior art windshield wipers generally involve complicated linkages with many bearings which generally comprised some lost motion and which would at certain portions of the stroke of the wiper blade have an unsatisfactory mechanical advantage with respect to other portions of the stroke. Moreover, with the large torques involved in connection with the long and heavy wiper blades used on trucks and buses, particularly under certain weather conditions (high winds, snow and ice, etc.), such linkage would fail with the resultant danger to passengers in the case of buses and the like. Torques in excess of four hundred inch pounds may be required. It would be desirable to provide a motor and wiper assembly wherein all linkage involving possible lost motion or improper mechanical advantage is eliminated and where maximum torque is available at any point in the blade stroke in case of ice or snow conditions. It would, furthermore, be desirable to provide such motor and wiper assembly which will give long years of trouble-free service.

Another problem with heavy duty windshield wipers concerns the adjustment of the blade relative to the windshield of the vehicle so that it cleans the desired area and yet does not strike the frame of the vehicle at either end of its stroke. This problem is particularly serious when it is appreciated that a long heavy blade must be supported and adjusted relative to a linkage or mechanism remote from one end thereof. It would, therefore, be desirable to provide an improved arrangement for eliminating this problem also.

Accordingly it is an object of the present invention to provide an improved windshield wiper assembly which overcomes the aforementioned difficulties.

Another object of the present invention is to provide as improved heavy duty windshield wiper motor.

A further object of the present invention is to provide an improved wiper motor which attains its maximum speed at an intermediate portion of its stroke, and which has its speed reduced as it approaches each end of its stroke.

Still another object of the present invention resides in the provision of an oscillating windshield wiper motor which, even though slowing down at the ends of its stroke, has full torque available at any point of its stroke.

A still further object of the present invention is to provide an improved windshield wiper assembly in which the angular position of the wiper blade with reference to the frame of the windshield can be quickly and easily adjusted.

Still another object of the present invention resides in the provision of improved means for adjusting the angular position of the windshield wiper blade with reference to the frame of the windshield.

Yet another object of the present invention is to provide an improved windshield wiper motor and windshield wiper assembly which does not require motion transmitting linkages between the drive motor and the wiper arm with resultant lost motion and variation in mechanical advantage.

Another object of the present invention resides in a windshield wiper assembly wherein the number of bearings are minimized.

Further objects and advantages of the invention will become apparent as the following description proceeds and the features of novelty which characterize the invention will be pointed out with particularity in the claims annexed to and forming a part of this specification.

Briefly stated, the present invention relates to an improved windshield wiper assembly of the type having an oscillatory pneumatic motor provided with an oscillating drive shaft drivingly connected to a wiper blade through a wiper arm, and to the wiper motor. The motor may be driven by any suitable source of pneumatic energy, and is adaptable to be driven by the air under pressure which is conventionally provided in buses and large trucks for operating and controlling air brakes and the like. The motor is provided with pneumatic control means effective to decelerate the wiper blade toward the end of its stroke so that the blade has its maximum speed intermediate the lengths of its strokes.

The pneumatic motor is provided with a housing forming a torus or ring-shaped working chamber containing a dam or divider constituting a fixed member dividing the chamber into a pair of arcuately shaped cylinders, each having one end closed by the divider and each having the other end thereof communicating with the other cylinder. A piston assembly is oscillatively positioned in each cylinder and the piston assemblies are connected by an arcuate crank arm positioned in the chamber through the open communicating ends of the cylinders and rigidly connected to oscillate the drive shaft of the motor. Pneumatic fluid under pressure is admitted sequentially first into one cylinder and then into the other to provide the successive power strokes to oscillate the motor. Valve means are provided to modulate the exhaust from the chamber to regulate the speed of the wiper. More specifically, the exhaust from the chamber is increasingly restricted as it approaches the end portion of each stroke of the wiper to decelerate the wiper motor and wiper blade. Additionally, a quick-throw mechanism is effective to switch the inlet fluid from one cylinder to the other, the mechanism performing the switching operation before the wiper blade reaches the end of its stroke so that the fluid is effective rapidly to decelerate the wiper motor and to reverse the direction of the shaft oscillations.

According to another aspect of the present invention there is provided an improved means of securing the wiper arm to the drive shaft in a selected angular position thereby to angularly adjust the wiper blade with reference to the frame of the windshield. To this end, the drive shaft of the wiper motor is provided with a conical serrated or splined end portion to which an arm supporting bracket or assembly is secured. The serrations on the drive shaft are at an angle greater than 7° which prevents a wedging action between these serrations and the cooperating serrations on the supporting bracket. This allows for easy disassembly of the parts. The bracket is formed of two members, one of which is apertured to receive the conical end portion of the drive shaft and the other which carries the wiper arm and which receives the first member in a recess therein. The second member additionally carries a pair of oppositely extending lead or set screws which bear against the first member and which provide a fine angular adjustment of the arm with respect to the drive shaft.

For a better understanding of the present invention, reference may be had to the accompanying drawings in which:

FIG. 10 is a sectional view taken along line 10—10 of FIG. 5, assuming FIG. 5 shows the complete structure, and illustrating the valve mechanism in one position of the motor stroke;

FIG. 16 is a fragmentary sectional view taken on line 16—16 of FIG. 15, assuming FIG. 15 shows the complete structure.

Figures 1, 2:
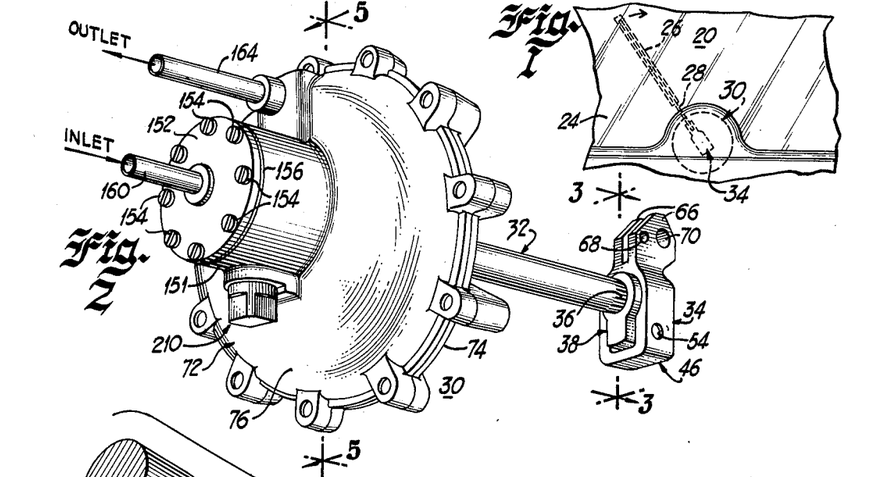
FIG. 1 is a fragmentary view of a motor vehicle from the interior thereof illustrating an application of the present invention.
FIG. 2 is a perspective view of the windshield wiper assembly but not including the wiper blades and the wiper arm.

Referring now to the drawings, and particularly to FIGS. 1 and 2 thereof, there is illustrated a windshield wiper assembly 20 embodying the present invention which is illustrated as being mounted on a vehicle having a windshield frame 22 supporting a windshield 24 therein.

The windshield wiper assembly 20 includes a wiper blade 26 mounted for oscillatory movement with respect to the windshield 24 on one end of a wiper blade arm 28. The construction of the blade, however, forms no part of the present invention and may have any form. An oscillatory pneumatic wiper motor 30 is provided as the motive means of the wiper assembly 20, and the wiper arm 28 is connected to a drive shaft 32 of the motor through a wiper arm head assembly or supporting bracket 34.

Figures 3, 4:
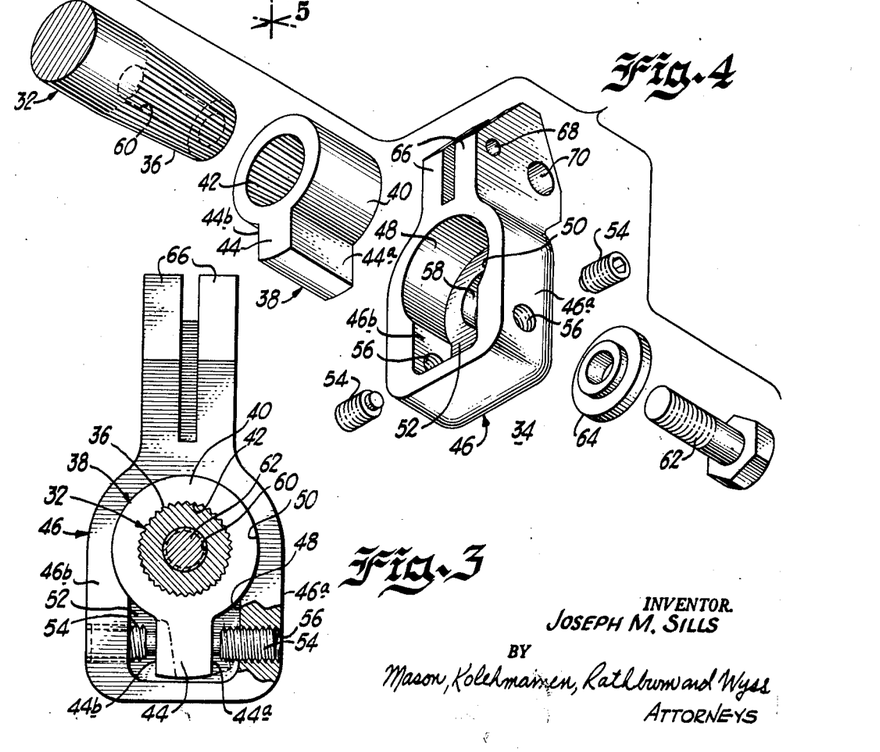
FIG. 3 is an enlarged sectional view taken along line 3—3 of FIG. 2 and illustrating the bracket connecting the drive shaft of the motor and the wiper arm.
FIG. 4 is an exploded perspective view of the bracket connecting the drive shaft of the motor and the wiper arm.

For the purpose of providing for the angular positioning of the wiper arm 28 into one of a plurality of selected positions on the drive shaft 32, the latter is provided with a coarse adjustment comprising a conical serrated or splined end portion 36 and the supporting bracket 34 is formed of two parts, one of which is a key-shaped socket member 38 having a body portion 40 of generally cylindrical shape and provided with a conical, serrated or splined aperture 42 complementary to the conical end portion 36 of the drive shaft 32 so that the member 38 may be positioned on the shaft 32 in any one of the positions wherein the respective serrations of the shaft 32 and the member 38 are aligned. In a device built in accordance with the present invention, the member 38 and the portion 36 of the shaft 32 had matching serrations at 9½° and 10°, respectively, thus preventing any wedging effect. The socket member 38 is additionally provided with a radially extending arm or dog portion 44. The second member of the supporting bracket 34 comprises a connecting member 46 provided with a keyhole-shaped recess 48 on one side thereof. The recess 48 includes a circular portion 50 which rotatably receives the body portion 40 of the socket member 38 and additionally includes a radially extending dog receiving rectangular recess 52 for loosely receiving the dog portion 44 of the socket member 38. When assembled, as best illustrated in FIGS. 2 and 3, the socket member 38 is received in the recess 48 with sufficient clearance being provided between the dog portion 44 and the dog receiving recess 52 of the connecting member 46 whereby the socket member 38 may be adjusted slightly angularly relative to the connecting member 46.

In order to provide the limited angular adjustment between the socket member 38 and the connecting member 46, there are provided a pair of threaded members or set screws 54 respectively received in a pair of threaded apertures 56 in the side walls 46a, 46b of the connecting member 46 and which open into the dog receiving recess 52 thereof. The set screws 54 extend through the opposite side walls 46a, 46b of the arm member 46 and engage opposite side surfaces 44a, 44b of the dog portion 44, as best illustrated in FIG. 3. It will be understood that loosening one of the set screws 54 and tightening the other will move the connecting member 46 angularly relative to the socket member 38, thus providing a fine adjustment of the relative angular positions.

To secure the supporting bracket 54 to the serrated end 36 of the drive shaft 32, the connecting member 46 is provided with a bolt opening 58 coaxial with the circular portion 50 of the recess 48 and extending through the arm member 46. Moreover, the drive shaft 32 is provided with an axial threaded aperture 60 in the end portion 36 axially aligned with the opening 58. A cap screw or bolt 62 is threaded into the opening 60 through the opening 58 to secure the supporting bracket 34 to the shaft 32. If desired, a washer 64 may cover the opening 58.

In order to connect the arm 28 to the supporting bracket 34, the arm member 46 is provided with a pair of upstanding ears 66, and two pairs of spaced aligned apertures 68, 70 extend through the ears 66 to provide for connection of the wiper arm 28. It is, of course, to be understood that any suitable means may be provided for this purpose to accommodate different forms of arms.

From the above description, it is believed that the adjustment of the arm 28, and consequently blade 26, with reference to the frame 22 of the windshield 24 is clear. However, briefly, the blade 28 may readily be angularly adjusted with reference to the windshield 24 by first angularly positioning the bracket 34 on the conical splined end 36 of the drive shaft 32 in an approximately selected position with the splines of the socket member 38 aligned with the splines of the end portion 36 for the approximate angular positioning of the arm 28, and the cap screw 62 may be tightened to secure the bracket 34 in this position. Thereafter, the connecting member 46 may be angularly adjusted to a very accurate degree by the adjustment of set screws 54. It will be appreciated that the angular adjustment attainable by the set screws 54 should be at least as great as the angular pitch of the splines in the drive shaft 32 and the shaft member 38. By virtue of the conical arrangement of end 36 of shaft 32, it will apparent that the heavy wiper blade 26, and the arm 28 and connecting member 46, will remain supported on shaft 32 at all times during the making of an angular adjustment of the blade relative to the windshield frame. In other words, cap screw 32 is only loosened sufficiently so relative rotation between shaft 32 and socket member 42 can occur for the coarse adjustment after which the fine adjustment is obtained by relative rotation of socket member 42 and connecting member 46.

Referring now to the wiper motor 30 (FIGS. 2 and 5-16), it includes a housing shown generally at 72 and including a pair of generally circular casing or housing sections 74 and 76 secured together by a first plurality of bolts 78 located near the periphery of the housing members 74 and 76 and by a second plurality of bolts 80 located around a center shaft opening 82 which extends through the housing 72 and which rotatably receives the drive shaft 32. Each of the housing members 74 and 76 define a circular recess 84 and 86, respectively, of generally semi-circular cross section so that, when assembled into the unitary housing 72, the recesses 84 and 86 form a torus or ring-shaped chamber 90 of circular cross section.

Figure 5:
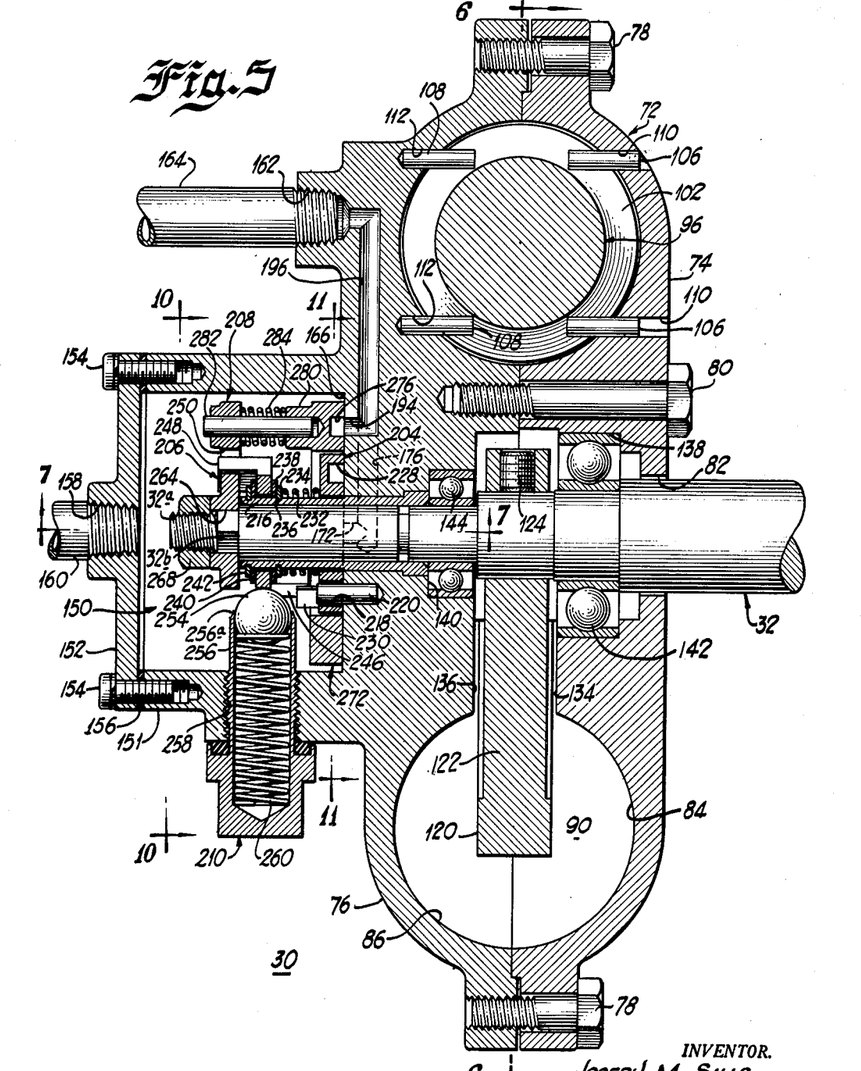
FIG. 5 is an enlarged sectional view of the wiper motor taken along line 5—5 of FIG. 2 and illustrating the motor near the center of its stroke.

For the purpose of dividing the chamber 90 into a pair of separate arcuate cylinders 90a and 90b, there is provided a circular dam or divider 96 of the diameter of the chamber 90. This divider 96 is provided with a plurality of peripheral grooves 98, 100 and 102 (FIGS. 5 and 6), the groove 102 being intermediate the grooves 98 and 100. Received in the grooves 98 and 100 are O-rings 104 thereby providing a fluid tight seal between arcuate cylinders 90a and 90b. The divider 96 is held in fixed position in housing 72 by virtue of a plurality of radially aligned pins 106 ad 108, respectively, positioned in holes 110 and 112 in the respective casing sections 74 and 76 and extending into the chamber 90 along a radial plane. These pins 106 and 108, furthermore, are received in the center groove 102 of the divider 96, as best illustrated in FIG. 5 of the drawings, thus holding the divider 96 in the fixed position shown. From the above description, it will be apparent that the chamber 90 is divided into a pair of arcuate cylinders 90a and 90b which are closed at the adjacent ends by the divider 96 but the other ends of which are interconnected.

Figure 6:
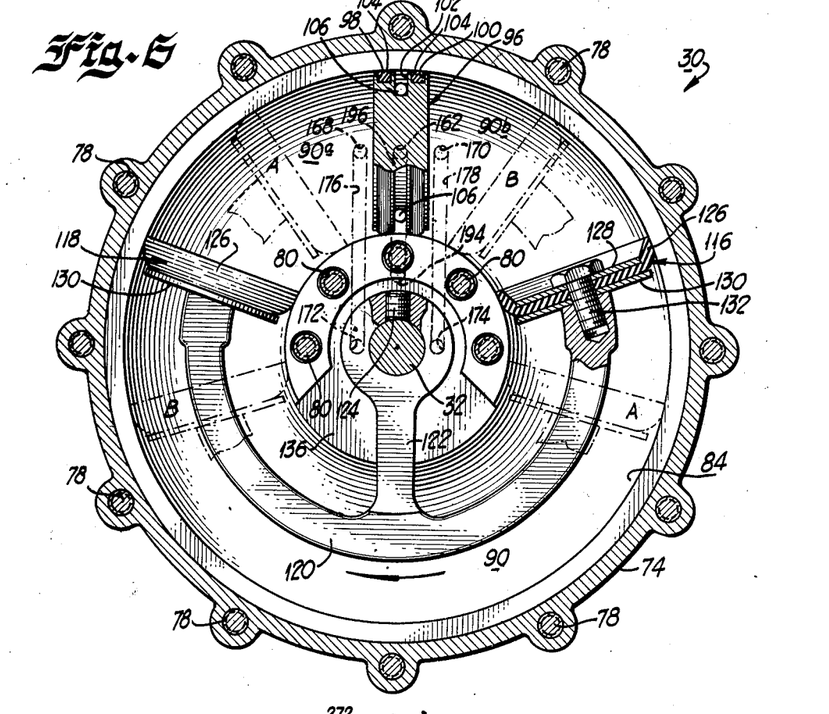
FIG. 6 is a sectional view taken along line 6—6 of FIG. 5, assuming that FIG. 5 shows the complete structure and showing several positions of the fluid motor parts as well as superimposing thereon, in phantom, the location of certain ports positioned in a cutaway portion of the structure.

To complete the fluid motor, a pair of opposed pistons 116 and 118 are provided for arcuate cylinders 90a and 90b, respectively, which pistons are rigidly interconnected by an arcuate connecting rod 120, the latter being wholly disposed within chamber 90. The connecting rod 120 is provided with a radially extending crank arm 122 preferably integrally formed with the connecting rod 120 and rigidly interconnected to the drive shaft 32 in any suitable manner such as by suitable key means or a set screw 124. Each of the pistons 116 and 118 comprises a cup-shaped leather member 126 supported between washer members 128 and 130 and secured to the arcuate connecting rod 120 as by a bolt 132. In order to insure that the cup-shaped members 126 have good sealing action with the walls of cylinders 90a and 90b, a cup spreader may be provided between washer 128 and cup-shaped members 126. In a device built in accordance with the present invention, a thin disk having peripheral prongs was employed, the prongs tending to press the cup-shaped members 126 against the cylinder walls. In order that the housing 72 does not interfere with the movement of crank arm 122, the casing sections 74 and 76 have a pair of complementary notches 134 and 136.

To house suitable bearing means for the drive shaft 32, the casing sections 74 and 76 also include annular recesses 138 and 140 for receiving and supporting bearing assemblies 142 and 144, respectively, therein. The shaft 32 is journalled in these bearing assemblies and these comprise the sole bearings for the fluid motor.

From the above description of the motor 30, it will be appreciated that pneumatic fluid under pressure admitted into one of the cylinders 90a or 90b and exhausted from the other will be effective to oscillate the pistons 116 and 118 to drive the drive shaft 32 toward the cylinder from which the pneumatic fluid is being exhausted. It will further be appreciated that reversal of the direction of intake and exhaust of the fluid will be effective to reverse the direction of the oscillation of the drive shaft 32. In this manner, the pistons 116 and 118 may be oscillated arcuately between the positions A and B, illustrated in phantom in FIG. 6, with the resultant oscillation of the drive shaft 32 and hence the wiper blade 26.

To control the fluid under pressure in a manner to insure the desired operation of the motor 30, there is provided a valve mechanism indicated generally at 150 (FIGS. 5, 7, 8 and 9), enclosed within a tubular protuberance forming a valve housing 151. Preferably tubular valve housing 151 is cast as an integral projection of casing section 76 and its open end is closed by a cover 152 secured in position by any suitable fastening means such as the screws 154. Suitable sealing means, such as a gasket 156, may be positioned between the cover 152 and the valve housing 151. Moreover, the cover 152 is provided with an inlet port 158 adapted to be connected by an inlet pipe 160 to a source of pneumatic fluid under pressure, such as is commonly available in large motor vehicles and used therein for operating power brakes and similar devices. Additionally, the housing member or casing section 76 is provided with an exhaust port 162 adapted to communicate with an outlet pipe 164.

For the purposes of controlling the admission and exhaust of pneumatic fluid to and from the cylinders 90a and 90b, the housing member 76 is provided with a plurality of passageways and ports which communicate between the cylinders 90a and 90b and the inlet and outlet ports 158 and 162. The valve mechanism 150 controls the particular flow of fluid at any time and includes an annular planar valve seat generally illustrated at 166 (FIGS. 5, 7 and 8) defined within the valve housing 151 concentric with the axis of the drive shaft 32. More specifically, fluid passageways 176 and 178 (FIGS. 6, 8 and 11), are provided having corresponding ends thereof 168 and 170 opening into the respective cylinders 90a and 90b adjacent the divider 96 so as to admit or exhaust air from the divider ends of cylinders 90a and 90b. The other ends of passageways 176 and 178 are in the form of valve controlled ports 172 and 174 which terminate in the annular valve seat 166. Also terminating on annular valve seat 166 are valve controlled ports 180, 182, 184 and 186. The valve controlled ports 180 and 182 are interconnected by a passageway 190 and are operatively associated with the valve controlled port 174. Similarly, the ports 184 and 186 are interconnected by a passageway 192 and are operatively associated with the valve controlled port 172. Additionally, a valve controlled exhaust port 194 terminates in annular valve seat 166, which port is connected by an exhaust passageway 195 with exhaust port 162 and consequently with outlet pipe 164. As will be best seen from FIGS. 8, 11, 13, 14 and 15, the ports 172, 174, 180 and 184 are arcuately positioned around the annular valve seat 166 along a circle C (FIG. 8) concentric with the axis of the drive shaft 32, while the valve controlled ports 182, 186 and 194 are arcuately positioned along a larger circle D concentric with circle C.

Figures 8, 9:
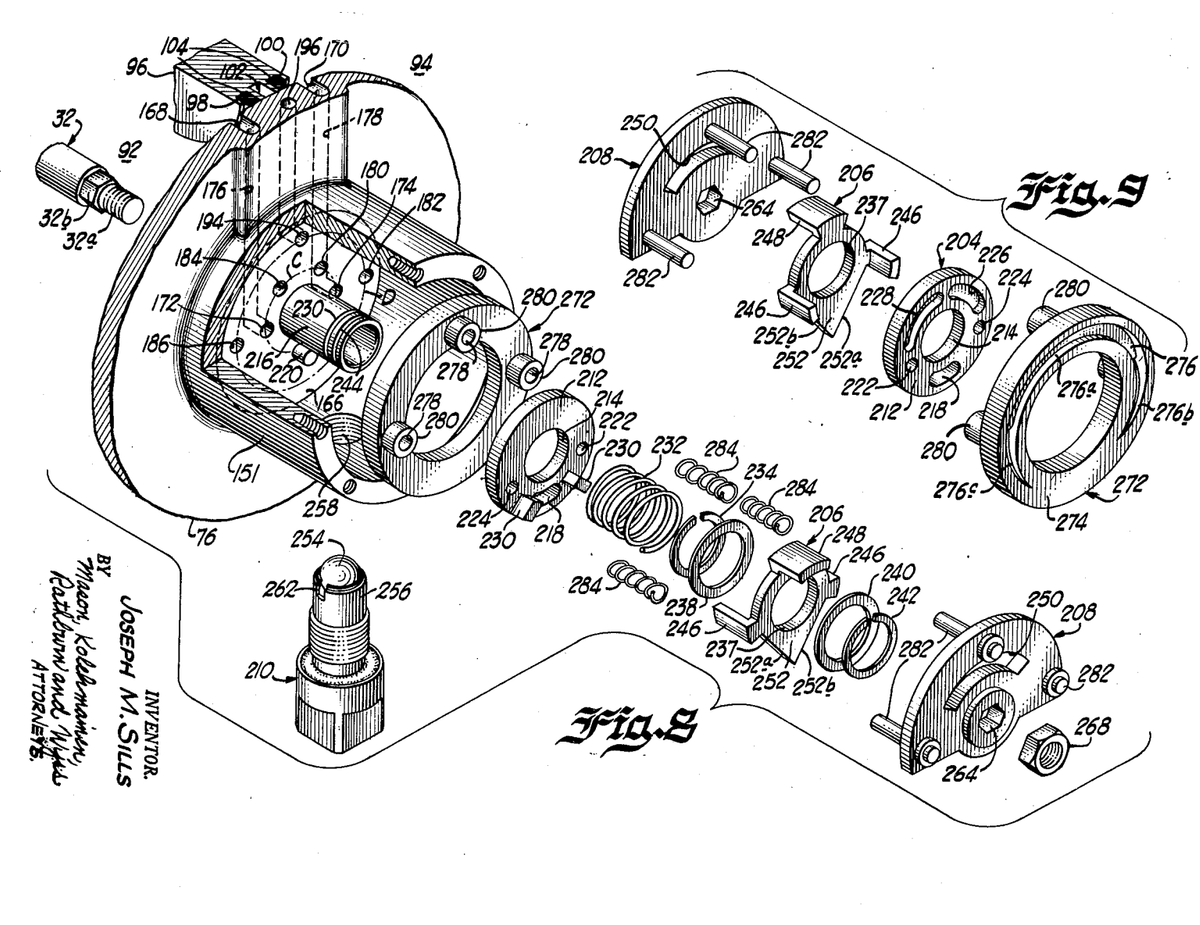
FIG. 8 is an exploded perspective view of the pneumatic control valve of the motor of the present invention.
FIG. 9 is another exploded perspective view from the opposite side of certain of the elements shown in FIG. 8.
Figure 10:
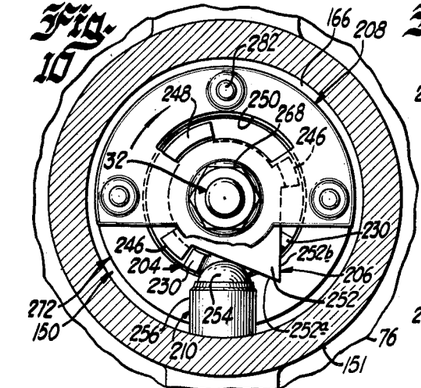
Figure 11:
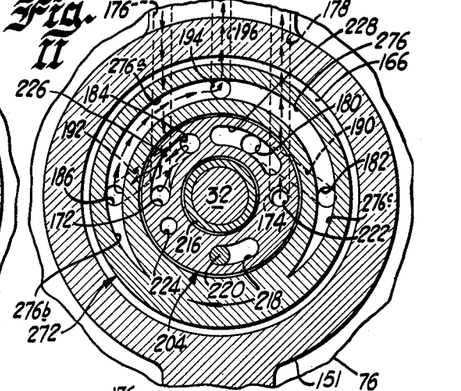
FIG. 11 is a sectional view taken along line 11—11 of FIG. 5, assuming that FIG. 5 shows the complete structure, and illustrating the pneumatic circuits of the motor.
Figure 12:
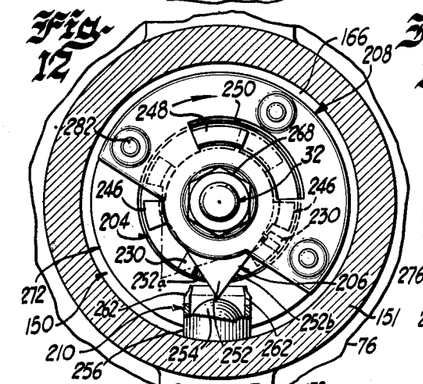
FIG. 12 is a sectional view like FIG. 10 illustrating the position of the parts when the drive motor is at a different point in its operating stroke, that is, with the wiper blade near one end of its stroke.
Figure 13:
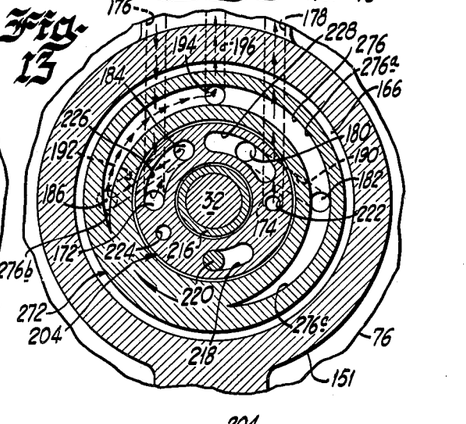
FIG. 13 is a sectional view like FIG. 11 but illustrating the pneumatic circuits of the motor for the position of the parts as shown in FIG. 12.
Figure 14:
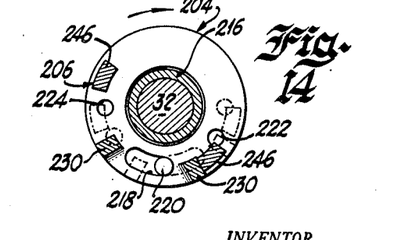
FIG. 14 is a view of a portion of FIGS. 10 and 12 illustrating yet another position of the valve mechanism in its operating cycle just at the point of stroke reversal.
Figure 15:
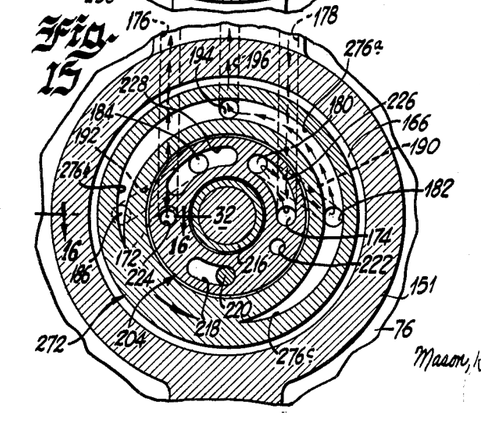
FIG. 15 is a sectional view similar to FIGS. 11 and 13 illustrating the pneumatic circuits for the position of the motor parts shown in FIG. 14.
Figure 16:
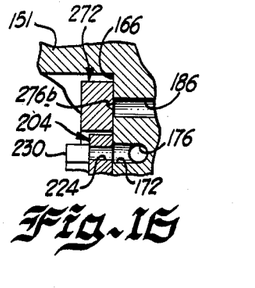

To sequentially admit air under pressure first into one of the cylinders 90a or 90b while exhausting the other, and then to admit air to the other while exhausting the first, there is provided a fluid flow switching mechanism including a rotary valve plate or valve 204, a switching cam 206, a rotary valve switching plate 208, and an over-center quick-throw mechanism 210. As best shown in FIGS. 8 and 9, the rotary valve 204, which cooperates with the part of annular valve seat 166 inside of the circle D running through the ports 182, 186 and 194, is also of washer or annular configuration having a body portion 212 with a central aperture 214 rotatably positioned on a tubular valve guide 216 which latter is suitably secured in housing 72 concentric with the axis of shaft 32. In fact, shaft 32 extends through valve guide 216, one end 32a of the shaft 32 being visible in FIG. 7 of the drawings. The rotary valve 204 is provided with an elongated arcuate motion limiting aperture or slot 218 extending therethrough for receiving a limit pin 220 extending from the valve plate 166. With this arrangement, pivotal movement of valve plate 204 is limited by pin 220. The extreme positions of this valve 204 are illustrated in FIGS. 11 and 15. To control the flow of fluid with respect to ports 172, 174, 180 and 184, rotary inlet valve 204 is provided with a pair of circular openings designated as 222 and 224 and a pair of arcuate recesses 226 and 228. The opening 222 is adapted to be aligned with the port 174 when the rotary valve 204 is in a first position, illustrated in FIGS. 10 to 13 of the drawings, while the port 224 is adapted to be aligned with the port 172 when the rotary inlet valve 204 is in a second of its positions, as illustrated in FIGS. 14 and 15 of the drawings. When opening 222 and port 174 are aligned, opening 224 is not aligned with any port and similarly when opening 224 is aligned with port 172, opening 222 is not aligned with any port. The openings 222 and 224 then control the particular cylinder 90a or 90b which is to receive the fluid under pressure. The arcuate recesses 226 and 228 control the exhaust from these same cylinders. Specifically, arcuate recess 226 is effective to interconnect the ports 172 and 184 when the inlet valve 204 is in the first of its positions as illustrated in FIGS. 10 to 13, and the recess 228 is effective to interconnect the ports 180 and 174 when the rotary inlet valve 204 is in the second of its positions as illustrated in FIGS. 14 and 15. It will be appreciated that the arcuate recesses 226 and 228 open on the side of valve 204 which seats against valve seat 166. It will furthermore be appreciated that when opening 222 is in position to permit fluid from inlet pipe 160 and chamber 151 to reach port 174 and hence cylinder 90b, arcuate recess 226 interconnects ports 172 and 184 thus permitting cylinder 90a to exhaust into passageway 192 leading to port 186. On the other hand, when opening 224 is in position to permit fluid from chamber 151 to reach port 172 and hence cylinder 90a, the other cylinder 90b is permitted to exhaust by virtue of the fact that arcuate recess 226 interconnects ports 174 and 180.

Figure 7:
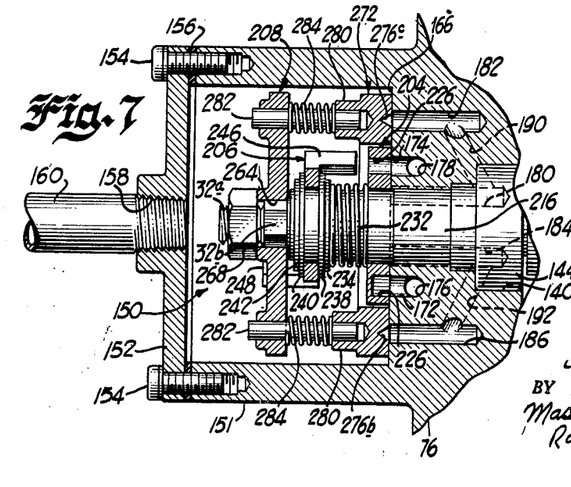
FIG. 7 is a sectional view taken along line 7—7 of FIG. 5, again assuming that FIG. 5 shows the complete structure.

For the purpose of permitting a force to be applied to valve 204 to pivot it between its extreme positions referred to above, valve 204 is provided with a pair of lugs 230 projecting from the side thereof opposite that containing the arcuate recess 226 and 228. As illustrated, one of these lugs 230 is disposed adjacent each end of arcuate opening 218. In order to hold valve 204 in seating engagement with annular valve seat 166, a helical compression spring 232 is provided which surrounds the valve guide 216. One end of spring 232 engages valve member 204, while the other end engages a stop in the form of a C-type spring washer 234 retained in a groove 236 in the valve guide 216, as illustrated in FIGS. 5, 7 and 8.

To actuate the rotary valve 204 between its first and second positions, as illustrated in FIGS. 11 and 15, respectively, there is provided the switching cam 206 which is also rotatably positioned on the valve guide 216, the latter extending through a central aperture 237 in cam 206. Cam 206 is held against axial movement along valve guide 216 between a pair of washers 238 and 240 (FIGS. 7 and 8), the washer 238 abutting against stop 234 while the washer 240 abuts against a similar stop 242 in the form of a C-type spring washer also retained in a groove 244 in the valve guide 216. The switching cam 206 is provided with a pair of projecting lugs extending toward the lugs 230 on the rotary valve 204 and engageable with these lugs to move pivot valve 204 in response to pivotal movement of cam 206. However, the lugs 246 are spaced at a wider angle than the lugs 230 so that some movement in either direction of cam 206 may take place without corresponding movement of valve 204.

In order that cam 206 may be driven by valve switching plate 208, the former is provided with a projecting lug 248 projecting in the opposite direction from lugs 246, which lug 248 is receivable within an arcuate aperture or slot 250 defined in the valve switching plate 208. Arcuate slot 250 is of substantially greater angular extent than lug 248 to provide a lost motion connection whereby considerable pivotal movement of switching plate 208 can occur without corresponding movement of cam 206. Furthermore, so that the switching cam 206 may be pivotally actuated with snap action, it is provided with a cam lobe 252 of generally V-shape disposed intermediate the lugs 246 and adapted to engage a ball 254 comprising part of the mechanism 210. The switching cam 206 is pivotally movable about the longitudinal axis of valve guide 216 between a first position where one side 252a of the lobe 252 engages the ball 254, as illustrated in FIG. 10, to a second position wherein the other side 252b of the lobe 252 engages the ball 254, as shown in phantom in FIG. 12 of the drawings.

It will be appreciated that the quick-throw mechanism 210 is provided to produce snap-acting pivotal movement of the switching cam 206 between its two extreme positions. Specifically the quick-throw mechanism 210 includes a tubular housing 256 suitably supported in valve housing 151. As illustrated, external threads are provided on one end of element 256, which is then threaded into a threaded opening 258 defined in the valve housing 151. The tubular housing 256 is effectively a retainer for ball 254 which is retained therein by a portion 256a of reduced diameter against which portion 256a the ball 256 is biased by a compression spring 260 contained within tubular housing 256. To permit lobe 252 of cam 206 to move from one side of tubular housnig 256, a pair of aligned grooves 262 (best shown in FIGS. 8 and 12) are provided in the end of housing 256 adjacent portion 256a thereof. With this arrangement, lobe 252 of the switching cam 206 may depress the ball 254 without interfering with the housing portion 256 of the quick-throw mechanism 210. When the switching cam 206 is rotated clockwise, from the position shown in FIG. 10 of the drawings, the lobe 252 thereof will ride over the ball 254 and through the grooves 262 of the switching cam 206 depressing the ball against the force of spring 260, thus reaching the exact center position thereof shown in FIG. 12 of the drawings. During this movement the right hand lug 246 of cam 206, as viewed in FIG. 12 moves so it is just ready to engage the right hand lug 230 of valve 204. The spring force acting on ball 254 as the lobe 252 passes over-center is effective rapidly to throw the switching cam 206 into the position shown in phantom in FIG. 12, whereby the rotary valve 204 is moved with a final quick motion of the switching cam 206 to rapidly effect transfer of the rotary valve 204 from the position shown in FIG. 11 to the position shown in FIG. 15. Obviously, reverse pivotal movement of elements 204 and 206 occurs in the same way.

As was pointed out above, the cam 204 is driven by valve switching plate 208 through interrelated lug 248 and slot or aperture 250. To drive plate 208, on the other hand, it is fixedly secured to the end 32a of the drive shaft 32, which extends through the valve insert 216 being provided with a hexagonal axial opening 264 for receiving a hexagonally-shaped portion 32b of the drive shaft 32 (FIG. 5 and 8) and secured in place by appropriate fastening means such as the nut 268 threaded on a threaded portion at the end 32a of the drive shaft 32.

To obtain one of the important objects of the present invention of providing the maximum speed of the wiper blade in the middle of its stroke and reduced speeds near the end of its stroke, there is provided an annular rotary exhaust modulating control valve 272 having an annular valve surface 274 engageable with the outer portion of the valve seat 166. This valve 272 is mounted for pivotal movement relative to valve seat 166 and is arranged to control the ports 182, 194 and 186. The modulating valve 272 is adapted to be concentrically mounted with respect to valve 204, as best shown in FIGS. 5 and 7 of the drawings. Thus, the valve 204 is pivotally mounted relative to the valve seat 166 to control the flow of fluid through ports 174, 180, 184 and 172, and the modulating valve 272 is similarly positioned but radially outwardly from valve 204 to control the fluid flow through ports 182, 194 and 186. The valve surface 274 of the modulating valve 272, engageable with valve seat 166, is provided with an arcuate exhaust modulating groove 276 having an angular extent of the order of 270 degrees, which groove is radially aligned with the ports 182, 194 and 186. This groove 276 includes a central portion 276a of generally uniform, rectangular cross section (FIG. 5) and two end modulating portions 276b and 276c of gradually decreasing cross-sectional area as the ends of groove 276 are approached. Obviously the cross-sectional area may decrease by decreasing either the width or depth of the groove 276 or by decreasing both the width and depth.

In order radially to position and support the modulating valve 272 and drivingly to interconnect the modulating valve 272 with the drive shaft 32 for movement therewith, the modulating valve 272 is provided with a plurality of short pin holes 278 defined in bosses 280 projecting from the modulating valve 272 on the side opposite the groove 276. Correspondingly, the valve switching plate 208 is provided with a plurality of pins 282 extending therefrom and slidingly seated in the pin holes 278 to position the modulating valve 272 relative thereto. As heretofore described, the valve switching plate 208 is fixedly secured to the end of the drive shaft 232 so that the modulating valve 272 is secured relative to the end 263 of the drive shaft 32 through the valve switching plate 208. For the purpose of continuously biasing the modulating valve 272 against the valve seat 166, there are provided a plurality of compression springs 284 concentrically positioned on the pins 282 and bearing against the modulating valve 272.

From the above description of the modulating valve 272, its operation will readily be understood by those skilled in the art. Briefly, however, the modulating valve 272 is movable with the drive shaft 32 to control the rate of exhaust of fluid from the respective cylinders 90a or 90b. Specifically, the modulating groove 276 is effective to interconnect the ports 186 and 182 with the exhaust port 194 communicating through passageway 196 with exhaust port 162 and outlet pipe 164. So long as the ports 182 or 186 are connected with the port 194 through the center unrestricted portion 276a of the modulating groove 276, substantially unrestricted resistance to the flow of exhaust fluid from the effective one of the ports 182 or 186 is offered by the modulating valve 272. However, as the modulating valve 272 is rotated so that fluid flowing between port 194 and the effective one of the ports 182 or 186 must flow through the end portions 276b or 276c of the modulating groove 276, a resistance to the flow of exhaust fluid from the respective one of the cylinders 90a or 90b will be introduced. FIG. 11 illustrates the position of the modulating valve 272 in presenting a maximum cross-sectional area to the flow of fluid between the effective exhaust port 186 and the port 194, FIG. 13 illustrates the modulating valve 272 in a position where a reduced cross section of the modulating groove 276 is presented between effective exhaust port 186 and the port 194, while FIGS. 5, 7 and 16 additionally illustrate the modulating groove 276 at various locations to present exhaust paths of different cross-sectional area.

In order to consider the operation of the motor 30, assume that the blade 26 is at the beginning of its clockwise stroke; that is, in the position illustrated in FIG. 1 of the drawings and beginning its clockwise movement as indicated by the arrows thereon. In this position the pistons 116 and 118 are in the positions illustrated in phantom and designated B in FIG. 6 of the drawings, the piston in cylinder 90b being at the divider end of its stroke and the piston in cylinder 90a being at the opposite end of its stroke. Movement of the shaft 32 from this position must be clockwise, as viewed in FIG. 6 of the drawings.

Although FIG. 11 shows the parts in an intermediate portion of the stroke, nevertheless, no movement of rotary valve 204 has occurred and it is shown in FIG. 11 in the position corresponding to that of the blade 26 in FIG. 1. In this position of rotary valve 204, aperture 222 thereof is aligned with port 174 leading to the port 170 in the cylinder 90b through the passageway 178. At the same time, recess 226 interconnects the ports 172 and 184 thereby connecting the port 168 in the other cylinder 90a with the outlet pipe 164 through the passageway 176, the port 172, the recess 226, the port 184, the passageway 192, the port 186, the modulating groove 276, the exhaust port 194 and the exhaust passageway 196. It is, of course, understood that the inlet port 222 in the rotary valve 204 communicates with the chamber defined by the valve housing 151, which in turn is connected to the linet pipe 160 connected to a source of fluid under pressure. With the parts in this position, air under pressure flows as indicated by the arrows in FIGS. 6 and 11 of the drawings, whereby the divider end of cylinder 90b receives air under pressure and the corresponding end of cylinder 90a is permitted to exhaust any fluid contained therein. Furthermore, as is clearly shown in FIG. 11 of the drawings, and assuming that the modulating groove 276 is rotated counterclockwise to substantially the position it assumes when blade 26 is in its FIG. 1 position, an unrestricted exhaust passageway is provided by the groove 96. Consequently, movement at high speed of shaft 32 and pistons 116 and 118 in a clockwise direction, as viewed in FIG. 6 of the drawings, from the B positions toward the A positions is initiated. Due to the positive drive connection between the shaft 32, the switching plate 208 and the modulating valve 272, as the wiper blade 26 moves in the direction of the arrow shown in FIG. 1 of the drawings to an intermediate position, the shaft 32, the switching plate 208 and the modulating valve 272 also move to the intermediate position, such as shown in FIGS. 10 and 11 of the drawings where lug 248 is engaged by the left-hand end of slot 250. Due to the lost motion connection between the switching plate 208 and the switching cam 206, and the further lost motion connection between the switching cam 206 and the valve 204, no movement of valve 204 occurs until the wiper blade 26 almost reaches the opposite end of the stroke from which it started. It will be noted that when switching plate 208 moves from the position of FIG. 10 to the position of FIG. 12, pivotal movement of cam 206 occurs, but due to the lost motion connection between cam 206 and valve 204, no movement of valve 204 occurs until subsequent to the position of the parts shown in FIGS. 12 and 13 of the drawings. This means, of course, that the port arrangement as far as valve 204 is concerned remains as shown in FIG. 11 and full fluid under pressure is supplied to the cylinder 90b of the fluid motor 30. Of course, continued rotation of modulating valve 272 causes a gradual restriction of the exhaust passageway, thereby to decelerate the windshield wiper blade 26 as it approaches the opposite end of its stroke. This restriction just begins to occur at about the position of valve 272, shown in FIG. 11 of the drawings. However, since the inlet passageway is not restricted in any way, the full force of the fluid under pressure is available at all times to move the wiper blade, and even if a high opposing force were encountered, such as might be due to snow or ice, the full fluid pressure of the source would be available to insure proper operation. The gradual restriction of the exhaust passageway is readily apparent from the successive views of FIGS. 11 and 13, where the arrows indicate that no change in the direction of flow of the fluid flow has occurred.

As was mentioned above, as the valve switching place 208 and, consequently, the modulating valve 272, reach an intermediate position (FIGS. 10 and 11) in the pivotal movement thereof, one end of the arcuate slot 250 engages the lug 248, and from that point on the switching cam 206 begins to move with the switching plate 208, whereby the cam lobe 252 moves against the spring force biasing the ball 254 to the position shown in FIG. 10 of the drawings. When the switching cam assumes the position shown in FIGS. 12 and 13 of the drawings where the right-hand lug 246 is almost ready to engage the lug 230 of the valve 204, this is substantially the end of the stroke of the pistons 116 and 118, which have been slowed down due to the restriction of the exhaust passageways by virtue of the modulating groove 276. Thereafter, the ball 254 causes the lobe 252 of switching cam 206 to move with a snap action to the dotted line position shown in FIG. 12, with the result that the rotary valve 204 is quickly moved from the position shown in FIGS. 11 and 13 to the position shown in FIG. 15. This automatically cuts off the flow of air through port 222 to cylinder 90b and, instead, connects port 224 with the port 172 of passageway 176 so that fluid under pressure is supplied to cylinder 90a instead of 90b. This quick snap acting motion of valve 204 from the position shown in FIG. 11 to the position shown in FIG. 15 occurs as the positions 116 and 118 reach the positions designated as A in FIG. 6 of the drawings. The flow of fluid is then as indicated by the arrows in FIG. 15 of the drawings, with the result that the wiper blade 26, which has been gradually slowed down in its clockwise motion, reverses and starts to move in the opposite direction, such movement being at high speed until slowed down as it returns to its original position. The introduction of fluid under pressure to the cylinder 90a just before the drive shaft 32 has reached the end of its stroke in a clockwise direction is effective quickly to stop the movement of the drive shaft 32 and reverse the direction of the wiper blade 26. The reverse stroke of the motor 32 is identical to that heretofore described except that the parts move in the opposite direction.

In view of the detailed description above, it will be apparent that there has been provided an improved windshield wiper motor and an improved windshield wiper assembly wherein the only bearings required are those for the shaft 32. All linkages have been completely eliminated so that there is no lost motion in the linkage at any point of the stroke which might result in a decrease of the mechanical advantage in some portion of the stroke. Moreover, with the arrangement described, maximum torque represented by the full pressure of the source or fluid is available at all times. This is because of the variable exhaust arrangement provided by the present invention, for if snow or ice build up to tend to increase the load on the blade 26 with the resultant slowing down thereof, the pressure differential between the fluid in cylinders 90a and 90b will build up to the full pressure available at the inlet port, thus providing the maximum operating torque even though the speed of the motor is regulated by the modulating valve 272. Additionally, the speed of movement of the wiper blade is decelerated as it approaches the end of its stroke, thereby greatly reducing the forces involved and providing a much more foolproof device than would be the case if it were necessary to stop the blade while travelling at high speed. Additionally, it will be appreciated that a windshield wiper built according to the present invention is provided with improved means for adjusting the alignment of the blade 26 with the windshield 24.

While a certain preferred embodiment of the invention has been described by way of illustration, it is to be understood that many changes and modifications may occur to those skilled in the art, and it is contemplated by the appended claims to cover any such changes and modifications as fall within the true spirit and scope of the invention.

What is claimed as new and desired to be secured by Letters Patent of the United States is:

1. An oscillatory windshield wiper motor comprising a housing forming a torus-shaped chamber, a fixed divider in said chamber dividing said chamber into first and second arcuate-shaped cylinders each having one end closed by said divider and the other ends communicating with each other, a pair of pistons positioned in respective ones of said cylinders, an oscillatory drive shaft concentric with said chamber, connecting means interconnecting said pistons and operatively associated with said shaft, first fluid means for sequentially admitting fluid under pressure first into said first cylinder and then into said second cylinder to oscillate said pistons, second fluid means for exhausting fluid sequentially with said first fluid means first from said second cylinder and then from said first cylinder, quick-throw means operatively controlling said fluid means, and means for modulating fluid flow in said second fluid means to decelerate movement of said pistons.

2. A windshield wiper motor comprising first and second cylinders each having one end closed and the other end communicating with a crank chamber, a pair of pistons positioned in respective ones of said cylinders, a drive shaft in said chamber, connecting means for interconnecting said pistons and operatively connected to drive said shaft, first fluid means for sequentially admitting fluid under pressure first into said first cylinder and then into said second cylinder to oscillate said pistons, second fluid means for exhausting fluid sequentially with said first fluid means first from said second cylinder and then from said first cylinder, quick-throw means operatively controlling said fluid means, and means for modulating fluid flow in said second fluid means to decelerate movement of said pistons.

3. An oscillatory windshield wiper motor comprising a housing forming a torus-shaped chamber; a fixed divider in said chamber dividing said chamber into first and second arcuately-shaped cylinders, each having one end closed by said divider and the other ends communicating with each other; a pair of pistons positioned in respective ones of said cylinders; an oscillatory drive shaft concentric with said chamber; connecting means interconnecting said pistons and operatively associated with said shaft; a cylindrical valve housing extending from the first-mentioned housing concentric with said shaft; a valve plate positioned in said valve housing and formed integrally with said first-mentioned housing and provided with a first, second, third, and fourth port opening in said plate at one radial distance from said shaft and additionally provided with a fifth and sixth port and an exhaust port opening therein at a greater radial distance from said shaft; passageways in said housing interconnecting said first cylinder and said first port, said second cylinder and said second port, said third and said fifth ports, and said fourth and said sixth ports, respectively; passageway means for connecting said exhaust port to exhaust means; a rotary valve concentrically mounted relative to said shaft and biased against said plate and provided with at least a pair of apertures extending therethrough adapted to be sequentially aligned with said first and said second ports, respectively, and additionally provided with a pair of recesses adjacent said plate adapted to sequentially interconnect said second and said fourth ports and said first and said third ports, respectively; modulating means biased against said plate concentrically mounted relative to said shaft radially outwardly of said rotary valve and provided with a groove of varying cross section and interconnecting said fifth and said sixth ports with said exhaust port; means in communication with said pair of apertures for connection to a source of fluid energy; means for rotating said modulating means with rotation of said shaft for varying the size of the recess interconnecting said exhaust port with one of said fifth and said sixth ports; and means operatively associated with said last-mentioned means and including quick-acting means for rotating said rotary valve after a predetermined movement of said shaft.

4. An oscillatory windshield wiper motor comprising a housing forming first and second arcuately-shaped cylinders, a first and a second piston positioned in respective ones of said cylinders and each arcuately movable between a first and a second position, an oscillatory drive shaft concentric with said cylinders; connecting means interconnecting said pistons and operatively associated with said shaft whereby said shaft is oscillatory between a first and a second position in response to the movement of said piston between the first mentioned first and second positions; a cylinder valve housing adjacent the first-mentioned housing concentric with said shaft; a valve plate positioned in said valve housing and formed integrally with said first-mentioned housing and provided with a first, second, third and fourth port opening in said plate at one radial distance from said shaft and additionally provided with a fifth and sixth port and an exhaust port opening therein at a greater radial distance from said shaft; passageways in said housing interconnecting said first cylinder and said first port, said second cylinder and said second port, said third and said fifth ports, and said fourth and said sixth ports, respectively; passageway means for connecting said exhaust port to said exhaust means; a rotary valve concentrically mounted to said shaft and biased against said plate and provided with at least a pair of apertures extending therethrough adapted to be sequentially aligned with said first and said second ports, respectively, and additionally provided with a pair of recesses adjacent said plate adapted to sequentially interconnect said second and said fourth ports and said first and said third ports, respectively; modulating means concentrically mounted relative to said shaft radially outwardly of said rotary valve and provided with a groove of varying cross section and interconnecting said fifth and said sixth ports with said exhaust port; means in communication with said pair of apertures for connection to a source of fluid energy; means operatively associated with said first shaft for rotating said modulating means between a first and a second position corresponding to the first and second positions of said shaft for reducing the size of the recess interconnecting said exhaust port with one of said fifth and said sixth ports as said shaft passes beyond an intermediate position of its oscillation in each direction, thereby to decelerate said shaft as it approaches the end of its stroke; and means operatively associated with said last-mentioned means and including quick-acting means for rotating said rotary valve as said shaft approaches the end of its stroke to effect reversal of said shaft.

5. A windshield wiper motor comprising a housing forming first and second cylinders; a pair of pistons positioned in respective ones of said cylinders; a drive shaft; connecting means operatively interconnecting said pistons and said shaft; a valve housing extending from the first-mentioned housing concentric with said shaft; a valve plate positioned in said valve housing provided with a first, second, third, fourth, fifth and sixth port and an exhaust port opening therein; passageways interconnecting said first cylinder and said first port, said second cylinder and said second port, said third and said fifth ports, and said fourth and said sixth ports, respectively; passageway means for connecting said exhaust port to exhaust means; a valve biased against said plate and provided with at least a pair of apertures extending therethrough adapted to be sequentially aligned with said first and said second ports, respectively; and additionally provided with a pair of recesses adjacent said plate adapted to sequentially interconnect said second and said fourth ports and said first and said third ports, respectively; modulating means biased against said plate and provided with a groove of varying cross section and interconnecting said fifth and said sixth ports with said exhaust port; means in communication with said pair of apertures for connection to a source of fluid energy; means for continuously positioning said modulating means in relation to the position of said shaft for varying the size of the recess interconnecting said exhaust port with one of said fifth and said sixth ports; and means operatively associated with said last-mentioned means and including quick-acting means for positioning said rotary valve after a predetermined movement of said shaft.

References Cited by the Examiner

UNITED STATES PATENTS

| | | | |
|---|---|---|---|
| 2,146,396 | 2/39 | Horton | 15—250.34 |
| 2,164,876 | 7/39 | Horlacher | 121—99 |
| 2,298,474 | 10/42 | Ericson et al. | 15—250.3 |
| 2,316,356 | 4/43 | Nette et al. | 121—99 |
| 2,612,141 | 9/52 | Freedman et al. | 15—250.16 |
| 2,738,535 | 3/56 | Horton | 15—250.34 |
| 2,753,850 | 7/56 | Baumgartner | 92—120 X |
| 2,997,727 | 8/61 | Ziegler | 15—250.35 |
| 3,045,272 | 7/62 | Oishei | 15—250.35 X |

CHARLES A. WILLMUTH, *Primary Examiner.*